United States Patent
Tao et al.

(10) Patent No.: US 12,359,837 B2
(45) Date of Patent: Jul. 15, 2025

(54) VARIABLE REFRIGERANT FLOW AIR CONDITIONING SYSTEM, CONTROL METHOD THEREOF, AND COMPUTER-READABLE STORAGE MEDIUM

(71) Applicants: MIDEA GROUP WUHAN REFRIGERATION EQUIPMENT CO., LTD., Hubei (CN); GD MIDEA AIR-CONDITIONING EQUIPMENT CO., LTD., Guangdong (CN)

(72) Inventors: Kui Tao, Hubei (CN); Shunquan Li, Hubei (CN)

(73) Assignees: MIDEA GROUP WUHAN REFRIGERATION EQUIPMENT CO., LTD., Hubei (CN); GD MIDEA AIR-CONDITIONING EQUIPMENT CO., LTD., Guangdong (CN)

( * ) Notice: Subject to any disclaimer, the term of this patent is extended or adjusted under 35 U.S.C. 154(b) by 190 days.

(21) Appl. No.: 18/132,670

(22) Filed: Apr. 10, 2023

(65) Prior Publication Data

US 2023/0250991 A1    Aug. 10, 2023

Related U.S. Application Data

(63) Continuation of application No. PCT/CN2021/096571, filed on May 28, 2021.

(30) Foreign Application Priority Data

Oct. 13, 2020 (CN) .......................... 202011094062.5

(51) Int. Cl.
*F24F 11/84* (2018.01)
*F24F 11/871* (2018.01)
*F24F 110/20* (2018.01)

(52) U.S. Cl.
CPC ............ *F24F 11/84* (2018.01); *F24F 11/871* (2018.01); *F24F 2110/20* (2018.01)

(58) Field of Classification Search
CPC ....... F24F 11/84; F24F 11/871; F24F 2110/20
See application file for complete search history.

(56) References Cited

FOREIGN PATENT DOCUMENTS

| CN | 104896682 A | 9/2015 |
|---|---|---|
| CN | 107166647 A | 9/2017 |

(Continued)

OTHER PUBLICATIONS

Liu, Multi-split system and time-sharing dehumidification method therefor, 2018, Full Document (Year: 2018).*

(Continued)

*Primary Examiner* — Nael N Babaa
(74) *Attorney, Agent, or Firm* — Scully, Scott, Murphy & Presser, P.C.

(57) ABSTRACT

A variable refrigerant flow (VRF) air conditioning system, a control method thereof, and a computer-readable storage medium are provided. When the VRF air conditioning system is cooling, indoor units in an operating state are obtained. Indoor units with humidity demand and indoor units without humidity demand in the operating state are obtained. A ratio of humidity demand is determined according to an output nominal value of each indoor unit in the operating state. The ratio can include a ratio of a total output nominal value of indoor units with humidity demand to a total output nominal value of indoor units without humidity demand. When the ratio is greater than a preset ratio, a rotation speed of an outdoor fan can be adjusted according to an outdoor environment temperature.

12 Claims, 9 Drawing Sheets

(56) References Cited

FOREIGN PATENT DOCUMENTS

| CN | 107575939 A | 1/2018 | |
|---|---|---|---|
| CN | 108562021 A | 9/2018 | |
| CN | 108709297 A | 10/2018 | |
| CN | 109059203 A | 12/2018 | |
| CN | 111412592 A | 7/2020 | |
| CN | 111578482 A | 8/2020 | |
| JP | 108189690 A | 7/1996 | |
| JP | 2017032251 A | 2/2017 | |
| KR | 20140090323 A | 7/2014 | |
| WO | 2017000642 A1 | 1/2017 | |
| WO | 2019033998 A1 | 2/2019 | |
| WO | WO-2019179474 A1 * | 9/2019 | ............. F24F 11/30 |

OTHER PUBLICATIONS

Supplementary European Search Report dated Mar. 19, 2024 received in European Patent Application No. EP 21878969.1.
International Search Report and Written Opinion dated Aug. 18, 2021 received in International Application No. PCT/CN2021/096571.
First Office Action dated Aug. 24, 2022 received in Chinese Patent Application No. CN 202011094062.5.

* cited by examiner

VARIABLE REFRIGERANT FLOW AIR CONDITIONING SYSTEM, CONTROL METHOD THEREOF, AND COMPUTER-READABLE STORAGE MEDIUM

CROSS-REFERENCE TO RELATED APPLICATIONS

This application is a continuation application of PCT International Patent Application No. PCT/CN2021/096571, filed on May 28, 2021, which claims priority to and benefits of Chinese Patent Application No. 202011094062.5, filed on Oct. 13, 2020, the entire contents of each of which are incorporated herein by reference for all purposes. No new matter has been introduced.

FIELD

The present disclosure relates to the field of air conditioners, and in particular to a variable refrigerant flow (VRF) air conditioning system, a control method thereof, and a computer-readable storage medium.

BACKGROUND

When the VRF air conditioning system is cooling, the outdoor unit is usually regulated according to the total cooling demand of each indoor unit. When the cooling demand of a single indoor unit is overly high, the total cooling demand will also be overly high, and the frequency of the compressor will increase, such that the evaporation temperature of each indoor unit is lower, the dehumidification effect is enhanced, and the room where each indoor unit is located has a large dehumidification capacity, which cannot meet the humidity demand of users in most rooms.

The above contents are only used to assist in understanding the technical solutions of the present disclosure, which does not mean that the above contents are admitted as prior art.

SUMMARY

An objective of the present disclosure is to provide a variable refrigerant flow (VRF) air conditioning system, a control method thereof, and a computer-readable storage medium, aiming to at least determine the humidity demand of each indoor unit and adjust the outdoor unit according to the humidity demand to meet the humidity demand of most indoor rooms.

In order to achieve the above objective, the present disclosure provides a method for controlling a VRF air conditioning system, including:
   obtaining indoor units in an operating state in response to that the VRF air conditioning system is cooling;
   obtaining the indoor units with humidity demand and the indoor units without humidity demand among the indoor units in the operating state;
   determining a ratio of humidity demand according to an output nominal value of each indoor unit in the operating state, wherein the ratio of the humidity demand includes a ratio of a total output nominal value of indoor units with humidity demand to a total output nominal value of indoor units without humidity demand, or, the ratio of the humidity demand includes a ratio of the total output nominal value of the indoor units with humidity demand to the total output nominal value of the indoor units with humidity demand and the indoor units without humidity demand; and
   in response to that the ratio of the humidity demand is greater than a preset ratio, adjusting a rotation speed of an outdoor fan according to an outdoor environment temperature and/or adjusting a frequency of a compressor according to a preset humidity corresponding to the indoor unit in the operating state.

In an embodiment, the obtaining the indoor units with humidity demand and the indoor units without humidity demand among the indoor units in the operating state includes:
   detecting a state of a working space corresponding to the indoor units in the operating state; and
   obtaining the indoor units with humidity demand and the indoor units without humidity demand among the indoor units that are in the operating state and the state of the working space is occupied.

In an embodiment, the adjusting the frequency of the compressor according to the preset humidity corresponding to the indoor unit in the operating state includes:
   obtaining a temperature difference between a current indoor temperature and a corresponding preset temperature corresponding to each indoor unit in the operating state; and
   adjusting the frequency of the compressor according to the preset temperature and the preset humidity of the indoor unit corresponding to a minimum temperature difference.

In an embodiment, the adjusting the frequency of the compressor according to the preset temperature and the preset humidity of the indoor unit corresponding to the minimum temperature difference includes:
   obtaining a target dew point temperature according to the preset temperature and the preset humidity of the indoor unit corresponding to the minimum temperature difference;
   obtaining a target suction saturation temperature according to the target dew point temperature; and
   adjusting the frequency of the compressor according to an actual suction saturation temperature of the compressor and the target suction saturation temperature.

In an embodiment, the method for controlling the VRF air conditioning system further includes:
   in response to that the ratio of the humidity demand is greater than the preset ratio, adjusting an opening degree of an electronic expansion valve of each indoor unit in the operating state according to an exhaust temperature of the compressor.

In an embodiment, the adjusting the opening degree of the electronic expansion valve of each indoor unit in the operating state according to the exhaust temperature of the compressor includes:
   in response to that the exhaust temperature is greater than or equal to an exhaust temperature threshold, adjusting the opening degree of the electronic expansion valve of each indoor unit in the operating state according to a preset opening degree adjustment value; or
   in response to that the exhaust temperature is lower than the exhaust temperature threshold, adjusting the opening degree of the electronic expansion valve of each indoor unit in the operating state according to an exhaust superheat degree.

In an embodiment, the adjusting the rotation speed of the outdoor fan according to the outdoor environment temperature includes:

obtaining a target heat exchange temperature according to the outdoor environment temperature, the target heat exchange temperature being greater than the outdoor environment temperature; and adjusting the rotation speed of the outdoor fan according to the target heat exchange temperature.

In an embodiment, the adjusting the rotation speed of the outdoor fan according to the target heat exchange temperature includes:

obtaining an exhaust saturation temperature of the compressor, the exhaust saturation temperature being a saturation temperature corresponding to an exhaust pressure of the compressor;

in response to that the exhaust saturation temperature is less than or equal to the target heat exchange temperature, reducing the rotation speed of the outdoor fan; or in response to that the exhaust saturation temperature is greater than the target heat exchange temperature, increasing the rotation speed of the outdoor fan.

In an embodiment, the method for controlling the VRF air conditioning system further includes:

in response to that the ratio of the humidity demand is less than the preset ratio, adjusting the opening degree of the electronic expansion valve of each indoor unit according to an outlet temperature of an indoor heat exchanger of each indoor unit in the operating state.

In an embodiment, the method for controlling the VRF air conditioning system further includes:

in response to adjusting the opening degree of the electronic expansion valve of the indoor unit according to the outlet temperature of the indoor heat exchanger of each indoor unit in the operating state, obtaining a current indoor humidity corresponding to the indoor unit with humidity demand;

in response to that the current indoor humidity corresponding to the indoor unit with humidity demand is lower than a first humidity, controlling a humidifying device corresponding to the indoor unit with humidity demand to operate; and in response to that the humidifying device is operating, if the current indoor humidity corresponding to the indoor unit with humidity demand is greater than a second humidity, controlling the humidifying device to stop operating, the second humidity being greater than the first humidity.

In addition, in order to achieve the above objective, the present disclosure further provides a variable refrigerant flow (VRF) air conditioning system, including: a memory, a processor that can be a hard-ware processor, and a program for controlling the VRF air conditioning system stored in the memory and executable on the processor, when the program for controlling the VRF air conditioning system is executed by the processor, the operations of the method for controlling the VRF air conditioning system as described above are implemented.

In addition, in order to achieve the above objective, the present disclosure further provides a computer-readable storage medium, a program for controlling a variable refrigerant flow (VRF) air conditioning system is stored in the computer-readable storage medium, and when the program for controlling the VRF air conditioning system is executed by a processor, the operations of the method for controlling the VRF air conditioning system as described above are implemented.

Embodiments of the present disclosure provide a VRF air conditioning system, a control method thereof, and a computer-readable storage medium. The method includes:

obtaining indoor units in an operating state in response to that the VRF air conditioning system is cooling; obtaining the indoor units with humidity demand and the indoor units without humidity demand among the indoor units in the operating state; determining a ratio of humidity demand according to an output nominal value of each indoor unit in the operating state, the ratio of the humidity demand includes a ratio of a total output nominal value of indoor units with humidity demand to a total output nominal value of indoor units without humidity demand, or, the ratio of the total output nominal value of the indoor units with humidity demand to the total output nominal value of the indoor units with humidity demand and the indoor units without humidity demand; and in response to that the ratio of the humidity demand is greater than a preset ratio, adjusting a rotation speed of an outdoor fan according to an outdoor environment temperature and/or adjusting a frequency of a compressor according to a preset humidity corresponding to the indoor unit in the operating state. In the present disclosure, by determining the humidity demand of each indoor unit in the operating state, the outdoor fan and the compressor are adjusted according to the humidity demand to adjust the dehumidification capacity of each indoor unit, so that the indoor humidity meets the humidity demand of most rooms.

The realization of the objective, functional characteristics, and advantages of the present disclosure are further described with reference to the accompanying drawings.

DETAILED DESCRIPTION OF EMBODIMENTS

It should be understood that the exemplary embodiments described herein are only used to explain the present disclosure, and are not intended to limit the present disclosure.

Embodiments of the present disclosure provide a solution. By determining the humidity demand of each indoor unit in the operating state, the outdoor fan and the compressor are adjusted according to the humidity demand to adjust the dehumidification capacity of each indoor unit, so that the indoor humidity meets the humidity demand of most rooms.

Figure 1:
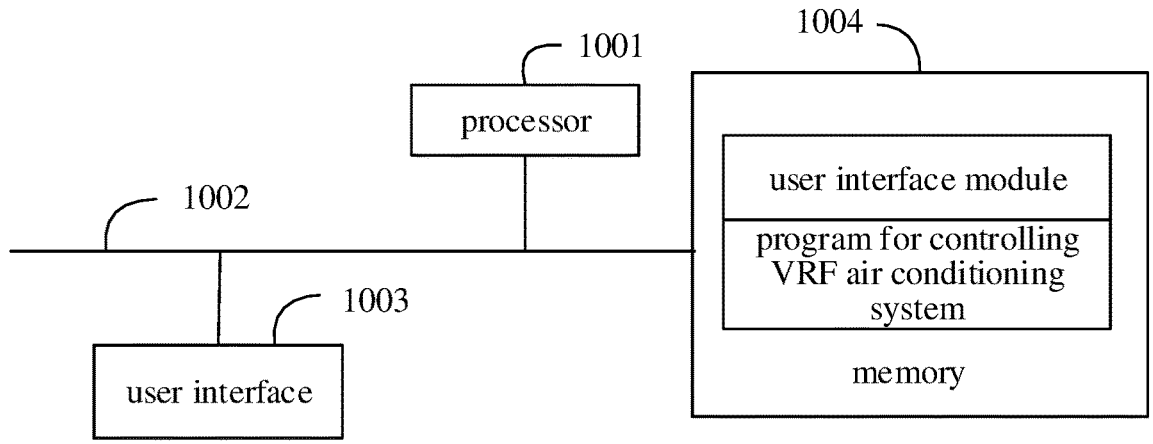
FIG. 1 is a schematic diagram of a terminal structure of a hardware operating environment involved in an embodiment of the present disclosure.

As shown in FIG. 1, FIG. 1 is a schematic diagram of a terminal structure of a hardware operating environment involved in an embodiment of the present disclosure.

The terminal according to the embodiments of the present disclosure can be a variable refrigerant flow (VRF) air conditioning system.

As shown in FIG. 1, the terminal may include a processor 1001, such as a hard-ware processor including a central processing unit (CPU), a communication bus 1002, a user interface 1003, and a memory 1004. The communication bus 1002 is configured to implement communication between the components. The user interface 1003 may include a display, and an input unit such as a keyboard. The user interface 1003 may further include a standard wired interface and a wireless interface. The memory 1004 may be a high-speed random access memory (RAM) or a non-volatile memory, such as a magnetic disk memory. The memory 1004 may also be a storage device independent of the processor 1001.

Those skilled in the art should understand that the terminal structure shown in FIG. 1 does not constitute a limitation on the terminal, and may include more or fewer components, a combination of some components, or differently arranged components than shown in the figure.

As shown in FIG. 1, the memory 1004 as a computer-readable storage medium may include a user interface module and a program for controlling a VRF air conditioning system.

In the terminal shown in FIG. 1, the user interface 1003 is mainly configured to connect to the client and perform data communication with the client. The processor 1001 can call the program for controlling the VRF air conditioning system stored in the memory 1004, and perform the following operations:
  obtaining indoor units in an operating state in response to that the VRF air conditioning system is cooling;
  obtaining the indoor units with humidity demand and the indoor units without humidity demand among the indoor units in the operating state;
  determining a ratio of humidity demand according to an output nominal value of each indoor unit in the operating state, wherein the ratio of the humidity demand includes a ratio of a total output nominal value of indoor units with humidity demand to a total output nominal value of indoor units without humidity demand, or, the ratio of the humidity demand includes a ratio of the total output nominal value of the indoor units with humidity demand to the total output nominal value of the indoor units with humidity demand and the indoor units without humidity demand; and
  in response to that the ratio of the humidity demand is greater than a preset ratio, adjusting a rotation speed of an outdoor fan according to an outdoor environment temperature and/or adjusting a frequency of a compressor according to a preset humidity corresponding to the indoor unit in the operating state.

Further, the processor 1001 can call the program for controlling the VRF air conditioning system stored in the memory 1004, and perform the following operations:
  detecting a state of a working space corresponding to the indoor units in the operating state; and
  obtaining the indoor units with humidity demand and the indoor units without humidity demand among the indoor units that are in the operating state and the state of the working space is occupied.

Further, the processor 1001 can call the program for controlling the VRF air conditioning system stored in the memory 1004, and perform the following operations:
  obtaining a temperature difference between a current indoor temperature and a corresponding preset temperature corresponding to each indoor unit in the operating state; and
  adjusting the frequency of the compressor according to the preset temperature and the preset humidity of the indoor unit corresponding to a minimum temperature difference.

Further, the processor 1001 can call the program for controlling the VRF air conditioning system stored in the memory 1004, and perform the following operations:
  obtaining a target dew point temperature according to the preset temperature and the preset humidity of the indoor unit corresponding to the minimum temperature difference;
  obtaining a target suction saturation temperature according to the target dew point temperature; and
  adjusting the frequency of the compressor according to an actual suction saturation temperature of the compressor and the target suction saturation temperature.

Further, the processor 1001 can call the program for controlling the VRF air conditioning system stored in the memory 1004, and perform the following operations:
  in response to that the ratio of the humidity demand is greater than the preset ratio, adjusting an opening degree of an electronic expansion valve of each indoor unit in the operating state according to an exhaust temperature of the compressor.

Further, the processor 1001 can call the program for controlling the VRF air conditioning system stored in the memory 1004, and perform the following operations:
  in response to that the exhaust temperature is greater than or equal to an exhaust temperature threshold, adjusting the opening degree of the electronic expansion valve of each indoor unit in the operating state according to a preset opening degree adjustment value; or
  in response to that the exhaust temperature is lower than the exhaust temperature threshold, adjusting the opening degree of the electronic expansion valve of each indoor unit in the operating state according to an exhaust superheat degree.

Further, the processor 1001 can call the program for controlling the VRF air conditioning system stored in the memory 1004, and perform the following operations:
  obtaining a target heat exchange temperature according to the outdoor environment temperature, the target heat exchange temperature being greater than the outdoor environment temperature; and
  adjusting the rotation speed of the outdoor fan according to the target heat exchange temperature.

Further, the processor 1001 can call the program for controlling the VRF air conditioning system stored in the memory 1004, and perform the following operations:
  obtaining an exhaust saturation temperature of the compressor, the exhaust saturation temperature being a saturation temperature corresponding to an exhaust pressure of the compressor;
  in response to that the exhaust saturation temperature is less than or equal to the target heat exchange temperature, reducing the rotation speed of the outdoor fan; or in response to that the exhaust saturation temperature is greater than the target heat exchange temperature, increasing the rotation speed of the outdoor fan.

Further, the processor 1001 can call the program for controlling the VRF air conditioning system stored in the memory 1004, and perform the following operations:

in response to that the ratio of the humidity demand is less than the preset ratio, adjusting the opening degree of the electronic expansion valve of each indoor unit according to an outlet temperature of an indoor heat exchanger of each indoor unit in the operating state.

Further, the processor 1001 can call the program for controlling the VRF air conditioning system stored in the memory 1004, and perform the following operations:

in response to adjusting the opening degree of the electronic expansion valve of the indoor unit according to the outlet temperature of the indoor heat exchanger of each indoor unit in the operating state, obtaining a current indoor humidity corresponding to the indoor unit with humidity demand;

in response to that the current indoor humidity corresponding to the indoor unit with humidity demand is lower than a first humidity, controlling a humidifying device corresponding to the indoor unit with humidity demand to operate; and in response to that the humidifying device is operating, if the current indoor humidity corresponding to the indoor unit with humidity demand is greater than a second humidity, controlling the humidifying device to stop operating, the second humidity being greater than the first humidity.

Figure 2:
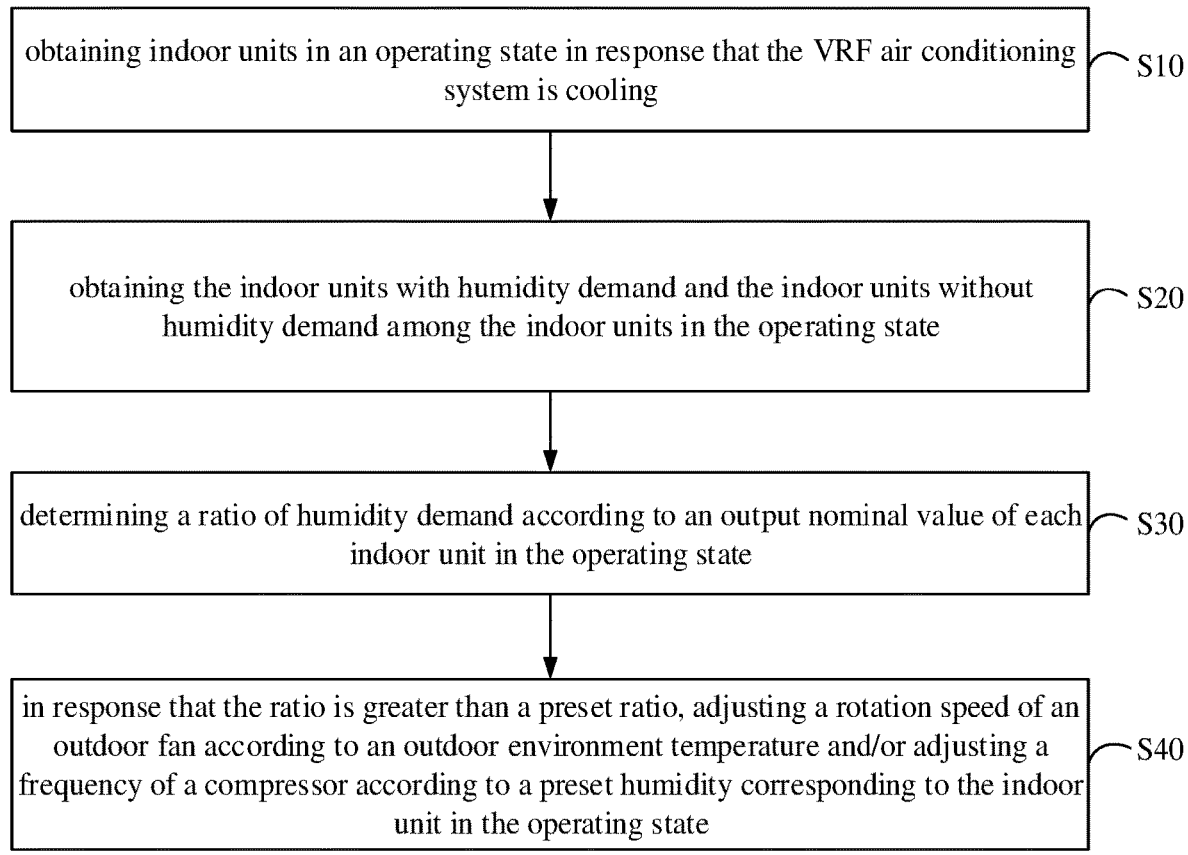
FIG. 2 is a schematic flowchart of a method for controlling a variable refrigerant flow (VRF) air conditioning system according to an embodiment of the present disclosure.

As shown in FIG. 2, in an embodiment, the method for controlling the VRF air conditioning system includes following operations.

Operation S10, obtaining indoor units in an operating state in response to that the VRF air conditioning system is cooling.

Operation S20, obtaining the indoor units with humidity demand and the indoor units without humidity demand among the indoor units in the operating state.

Figure 6:
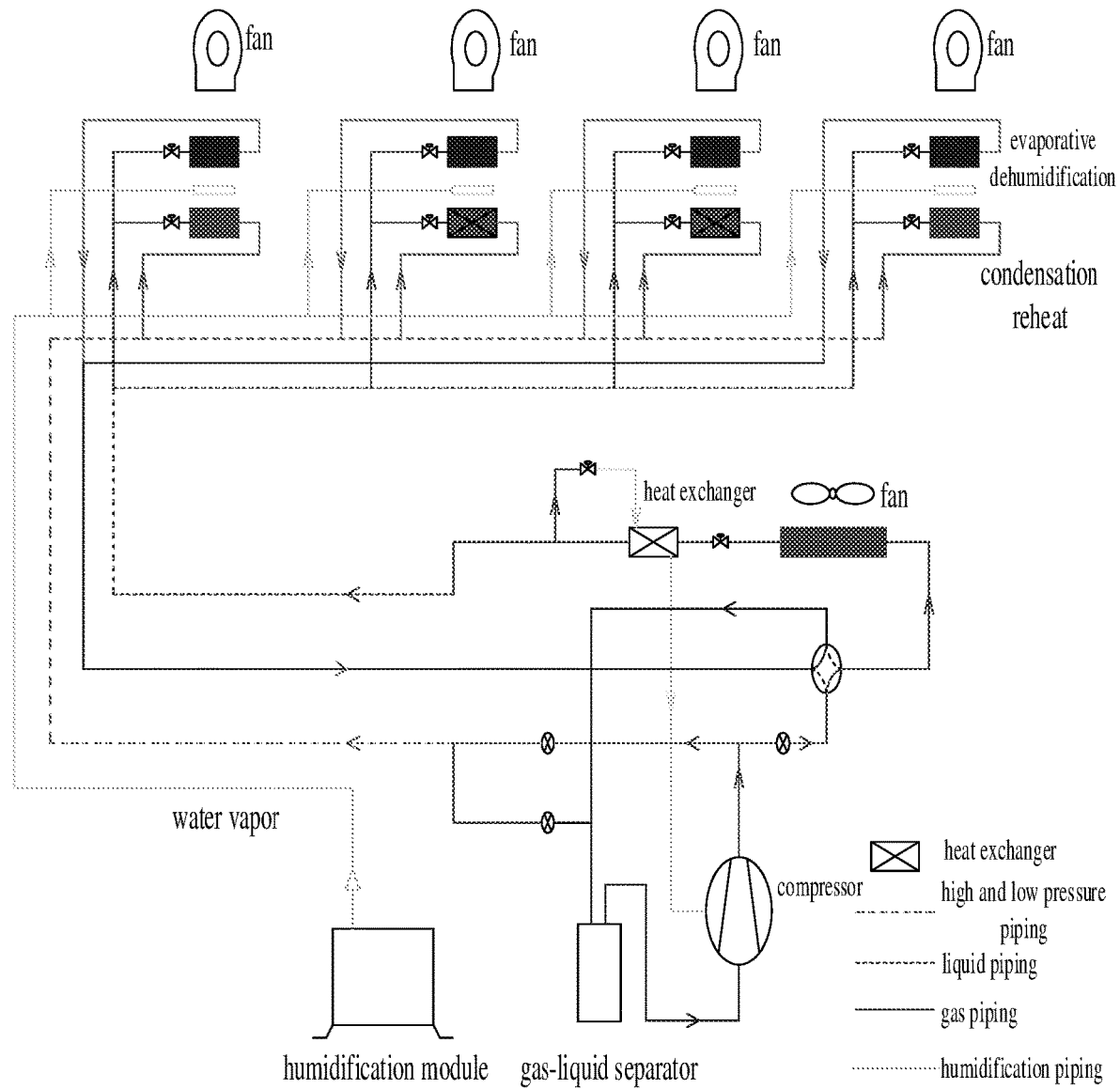
FIG. 6 is a schematic diagram of the overall connection relationship of the VRF air conditioning system of the present disclosure.

In this embodiment, the terminal is the VRF air conditioning system shown in FIG. 6. Different indoor units in the VRF air conditioning system have different working spaces. When there is a cooling demand in a certain working space, the corresponding indoor unit starts and cools in the working space. When the VRF air conditioning system is cooling, the indoor units in the operating state are regularly obtained, and whether each indoor unit in the operating state has humidity demand is regularly detected to determine the indoor units with humidity demand and the indoor units without humidity demand.

In an embodiment, whether the indoor unit in the operating state meets the preset humidity demand condition is determined. If the indoor unit in the operating state meets the preset humidity demand condition, it is determined that the indoor unit has humidity demand, and if the indoor unit in the operating state does not meet the preset humidity demand condition, it is determined that the indoor unit does not have humidity demand. In an embodiment, the humidity demand condition may include at least one of the indoor unit receiving a humidity demand instruction triggered by a user, the current indoor humidity of the indoor unit being lower than the humidity threshold, the difference between the current indoor temperature of the indoor unit and the preset temperature being less than the preset difference, the cooling duration required for the current indoor temperature of the indoor unit to reach the preset temperature being less than the preset duration. The preset duration is an acceptable cooling duration for the user, that is, how long the user expects the current indoor environment temperature to reach the preset temperature.

Figure 11:
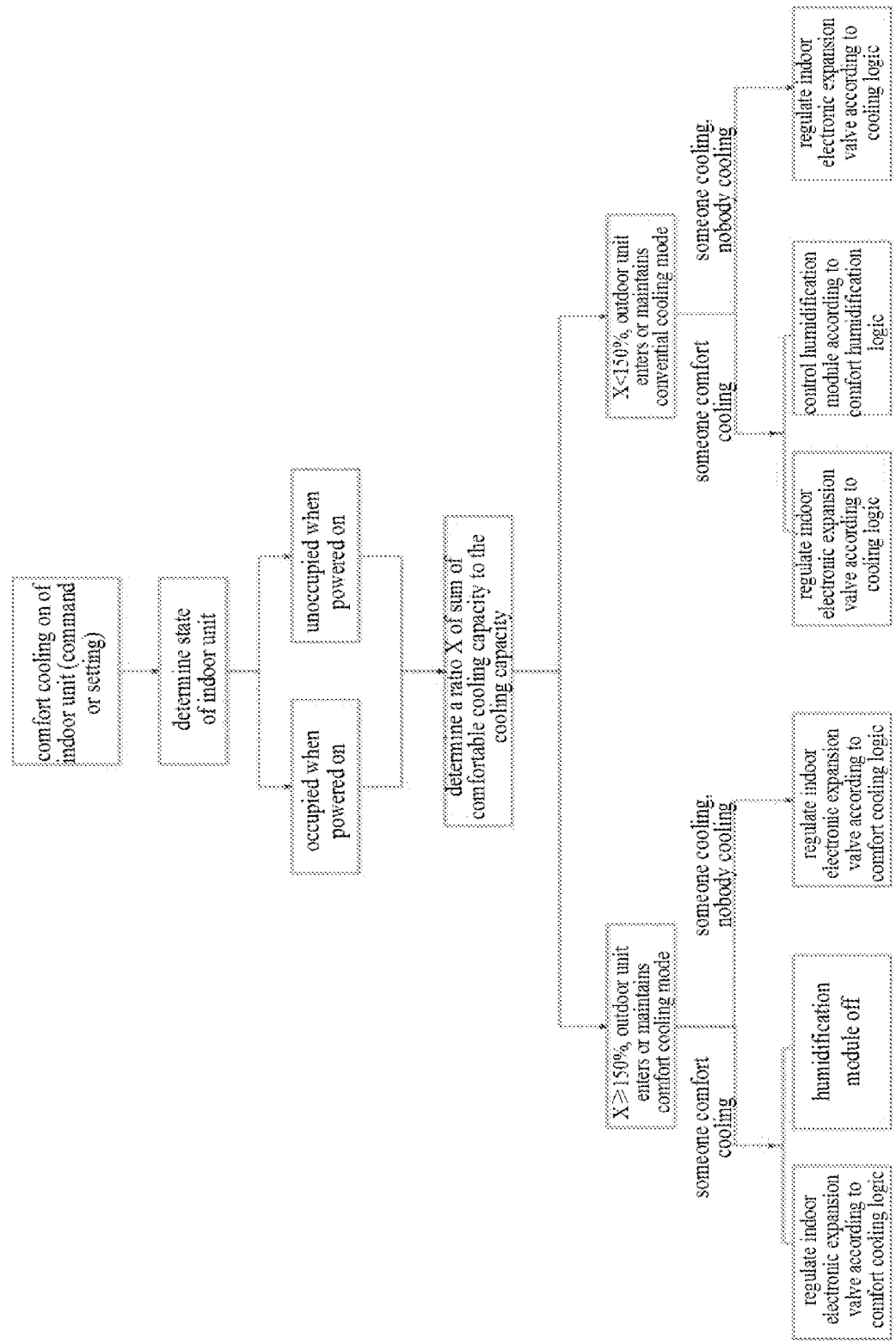
FIG. 11 is another schematic diagram of the overall control logic of the present disclosure.

In an embodiment, since whether the indoor environment is comfortable or not is for the user, the adjustment of the indoor environment parameters without the user cannot play a role. Thus, as shown in FIG. 11, among the indoor units in the operating state, when obtaining the indoor units with humidity demand and the indoor units without humidity demand, the state of the working space corresponding to each indoor unit in the operating state can also be detected firstly. If the indoor unit is operating and the corresponding working space is occupied, the humidity demand of the indoor unit needs to be considered. If the indoor unit is operating, but the corresponding working space is unoccupied, there is no need to consider the humidity demand of the indoor unit. Therefore, for the indoor units that are in the operating state and the state of the working space is occupied, the indoor units with humidity demand and the indoor units without humidity demand are obtained, and the ratio of humidity demand is determined according to the output nominal value of each indoor unit that is in the operating state and the state of the working space is occupied. For indoor units that are not in the operating state and indoor units that are in the operating state and the state of the corresponding working space is unoccupied, their humidity demands are ignored. It should be noted that comfort is subjective, and it is more realistic to determine the humidity demand only for indoor units that are occupied. The cooling of indoor units that are unoccupied does not require cooling time, and the final temperature and humidity control is sufficient. Then, this type of indoor unit is a vassal and can be adjusted according to the control logic of the indoor unit that is occupied.

Operation S30, determining a ratio of humidity demand according to an output nominal value of each indoor unit in the operating state. The ratio of the humidity demand includes a ratio of a total output nominal value of indoor units with humidity demand to a total output nominal value of indoor units without humidity demand, or includes a ratio of the total output nominal value of the indoor units with humidity demand to the total output nominal value of the indoor units with humidity demand and the indoor units without humidity demand.

In this embodiment, since the cooling capacity of indoor units with different types may vary, the output nominal value of each indoor unit in the operating state can be obtained to determine the total output nominal value of the indoor units with humidity demand, and the ratio of humidity demand can be determined according to the total output nominal value of the indoor units with humidity demand. In an embodiment, the ratio of the humidity demand can include the ratio of the total output nominal value of indoor units with humidity demand to the total output nominal value of indoor units without humidity demand, or calculate the total output nominal value of the indoor units with humidity demand and the indoor units without humidity demand. The ratio of the humidity demand includes the ratio of the total output nominal value of the indoor units with humidity demand to the total output nominal value of the indoor units with humidity demand and the indoor units without humidity demand. The ratio of humidity demand is used to characterize the degree of humidity demand of all indoor users.

Operation S40, in response to that the ratio of the humidity demand is greater than a preset ratio, adjusting a rotation speed of an outdoor fan according to an outdoor environment temperature and/or adjusting a frequency of a compressor according to a preset humidity corresponding to the indoor unit in the operating state.

Figure 7:
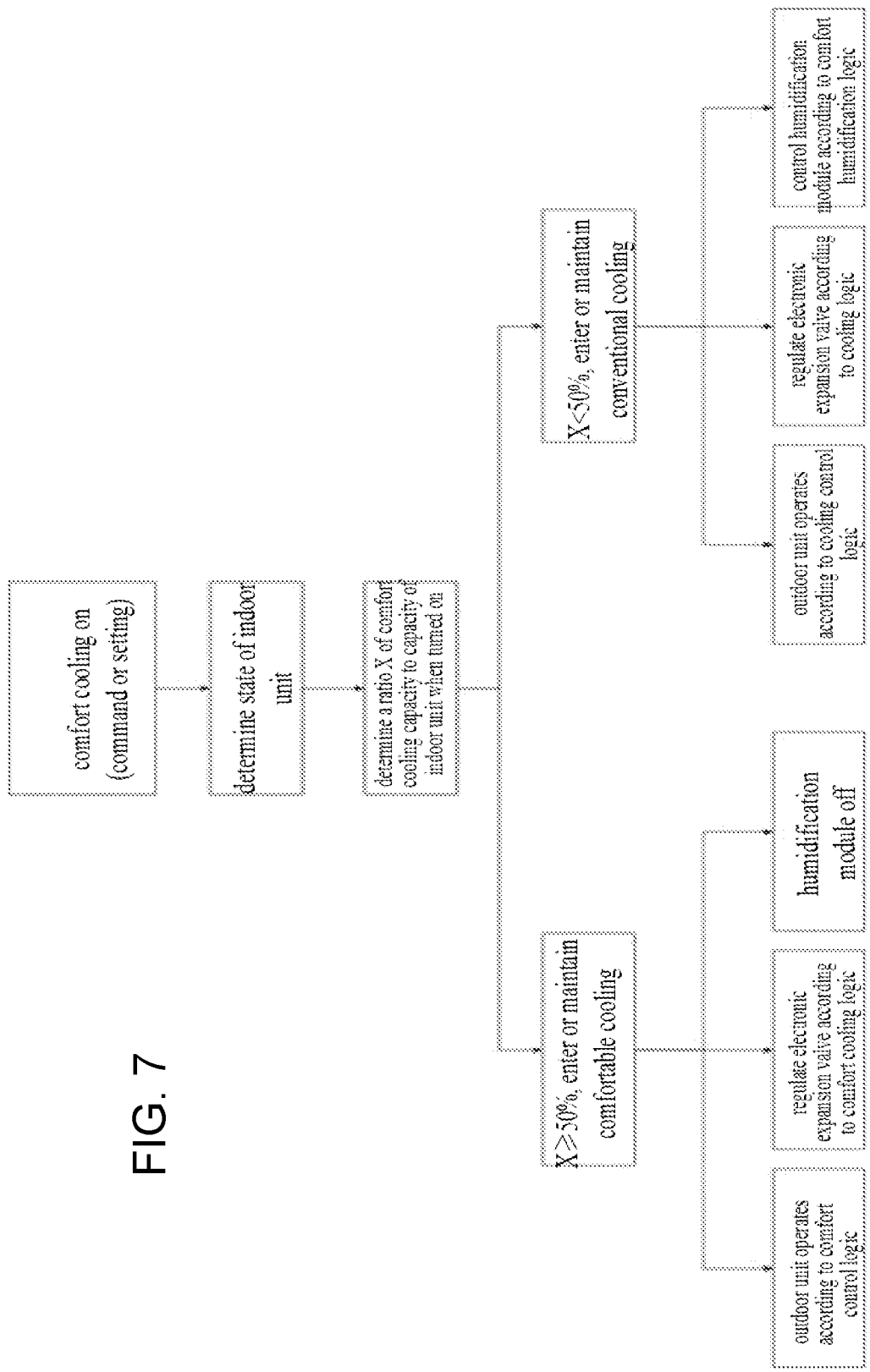
FIG. 7 is a schematic diagram of the overall control logic of the present disclosure.

In this embodiment, as shown in FIG. 7, when the ratio of the humidity demand is greater than the preset ratio, it indicates that all indoor users have a greater demand for humidity. Therefore, the outdoor unit can be controlled to perform comfortable cooling, and the rotation speed of the outdoor fan can be adjusted according to the outdoor environment temperature and/or the frequency of the compressor can be adjusted according to the preset humidity corresponding to the indoor unit in the operating state, thereby reducing dehumidification while cooling, and trying to meet the needs of indoor users for humidity. When the ratio of the humidity demand is less than the preset ratio, it indicates that all indoor users have little demand for humidity. Therefore, the outdoor unit can be controlled for conventional cooling, and the frequency of the outdoor fan and/or compressor can be controlled according to the conventional cooling control logic. For example, the preset ratio can be 50%. When the ratio of the humidity demand is greater than 50%, the outdoor fan, the compressor, the electronic expansion valve and all indoor units in the operating state of the VRF air conditioning system are controlled to enter or maintain comfortable cooling. When the ratio of the humidity demand is less than or equal to 50%, the outdoor fan, the compressor, the electronic expansion valve and all indoor units in the operating state of the VRF air conditioning system are controlled to enter or maintain conventional cooling.

In an embodiment, when the rotation speed of the outdoor fan is adjusted according to the outdoor environment temperature, the heat dissipation efficiency of the outdoor heat exchanger is adjusted by adjusting the rotation speed of the outdoor fan, so that the temperature reached by the refrigerant after condensation in the outdoor heat exchanger is higher than the outdoor environment temperature. That is, the outlet refrigerant temperature of the outdoor heat exchanger is higher than the outdoor environment temperature. In this way, the temperature of the indoor coil will increase accordingly, thereby reducing the dehumidification capacity of each indoor unit to meet the humidity demands of indoor users. When adjusting the frequency of the compressor according to the preset humidity corresponding to the indoor unit in the operating state, by considering the humidity demand and adjusting the frequency of the compressor according to the humidity demand, the indoor relative humidity can substantially reach the indoor set humidity, so as to meet the humidity demand of indoor users.

In an embodiment, as shown in FIG. 6, the VRF air conditioning system further includes a humidification module. The humidification module is used to provide humidification capabilities for each indoor unit respectively, and can also control each indoor unit to perform humidification when the humidity demand ratio is greater than the preset ratio. In an embodiment, when the humidity demand ratio is greater than the preset ratio, the current indoor temperature of each indoor unit can also be detected. If the difference between the current indoor temperature and the preset temperature is less than the preset value, the indoor unit will be controlled to humidify. For example, when the difference between the current indoor temperature and the preset temperature is less than 2 and the current indoor humidity is less than 50%, the indoor unit is controlled to humidify, and when the current indoor humidity is detected to be greater than 65%, the indoor unit is controlled to stop humidification. In an embodiment, when the air conditioner is performing normal cooling and the cooling capacity is strong, the humidification module does not operate, so as to prevent the water vapor generated by the humidification module from rapidly condensing into water droplets, causing the indoor environment to be humid.

In an embodiment, when the ratio of the humidity demand is less than the preset ratio, it indicates that all indoor users have a greater demand for humidity. Since the outdoor unit is controlled according to the conventional cooling logic at this time, even indoor units with humidity demands need to be controlled according to conventional cooling logic, to avoid the opening degree of the electronic expansion valve of the indoor unit with humidity demands being overly small and the flow rate overly small, resulting in high exhaust temperature of the outdoor unit and affecting the cooling effect of the room. That is, all indoor units in the operating state must be controlled according to the conventional cooling logic, and the opening degree of the electronic expansion valve of the corresponding indoor unit is adjusted according to the outlet temperature of the indoor heat exchanger of the indoor unit.

In an embodiment, when the indoor units with humidity demands are also controlled according to the conventional cooling logic, the humidity demands of the indoor units with humidity demands may not be met. At this time, the current indoor humidity corresponding to the indoor unit with humidity demand can be obtained. If the current indoor humidity corresponding to the indoor unit with humidity demand is lower than the first humidity, it indicates that the humidity demand of the indoor unit cannot be met, so the operation of the humidifying device corresponding to the indoor unit with humidity demand can be controlled. When the humidifying device is operating, if it is detected that the current indoor humidity corresponding to the indoor unit that has a humidity demand is greater than the second humidity, it indicates that the humidity demand of the indoor unit is met, so it can be detected that the humidifying device stops humidifying. The second humidity is greater than the first humidity, for example, the first humidity may be 50%, and the second humidity may be 65%. In an embodiment, if the current indoor humidity corresponding to the indoor unit with humidity demand is lower than the first humidity, the difference between the current indoor temperature corresponding to the indoor unit with humidity demand and the corresponding preset temperature may be further detected. If the difference is less than the preset difference, the operation of controlling the humidifying device to operate corresponding to the indoor unit with humidity demand is executed.

In the technical solutions of the present disclosure, by determining the humidity demand of each indoor unit in the operating state, the outdoor fan and the compressor are adjusted according to the humidity demand to adjust the dehumidification capacity of each indoor unit, so that the indoor humidity meets the humidity demand of most rooms.

Figure 3:
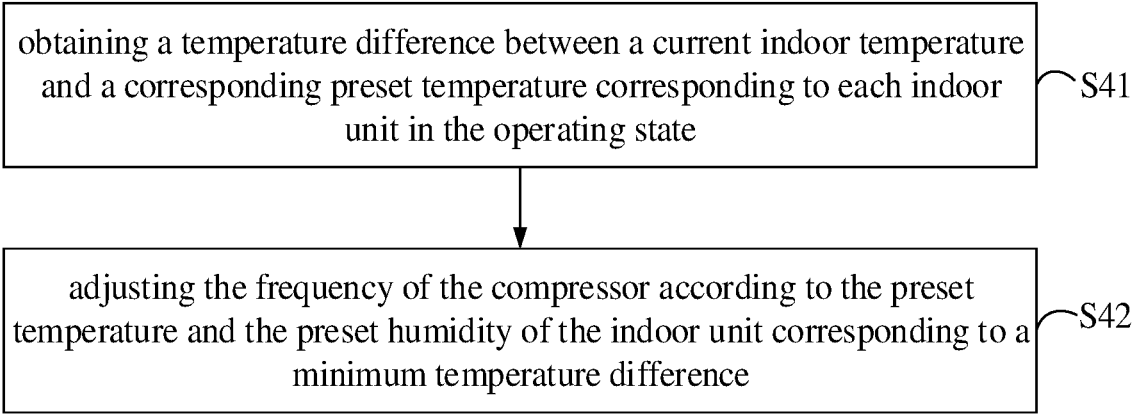
FIG. 3 is a schematic flowchart of the method for controlling the VRF air conditioning system according to another embodiment of the present disclosure.

In another embodiment, as shown in FIG. 3, based on the embodiment shown in FIG. 2, the operation of adjusting the frequency of the compressor according to the preset humidity corresponding to the indoor unit in the operating state includes:

Operation S41, obtaining a temperature difference between a current indoor temperature and a corresponding preset temperature corresponding to each indoor unit in the operating state.

Figure 8:
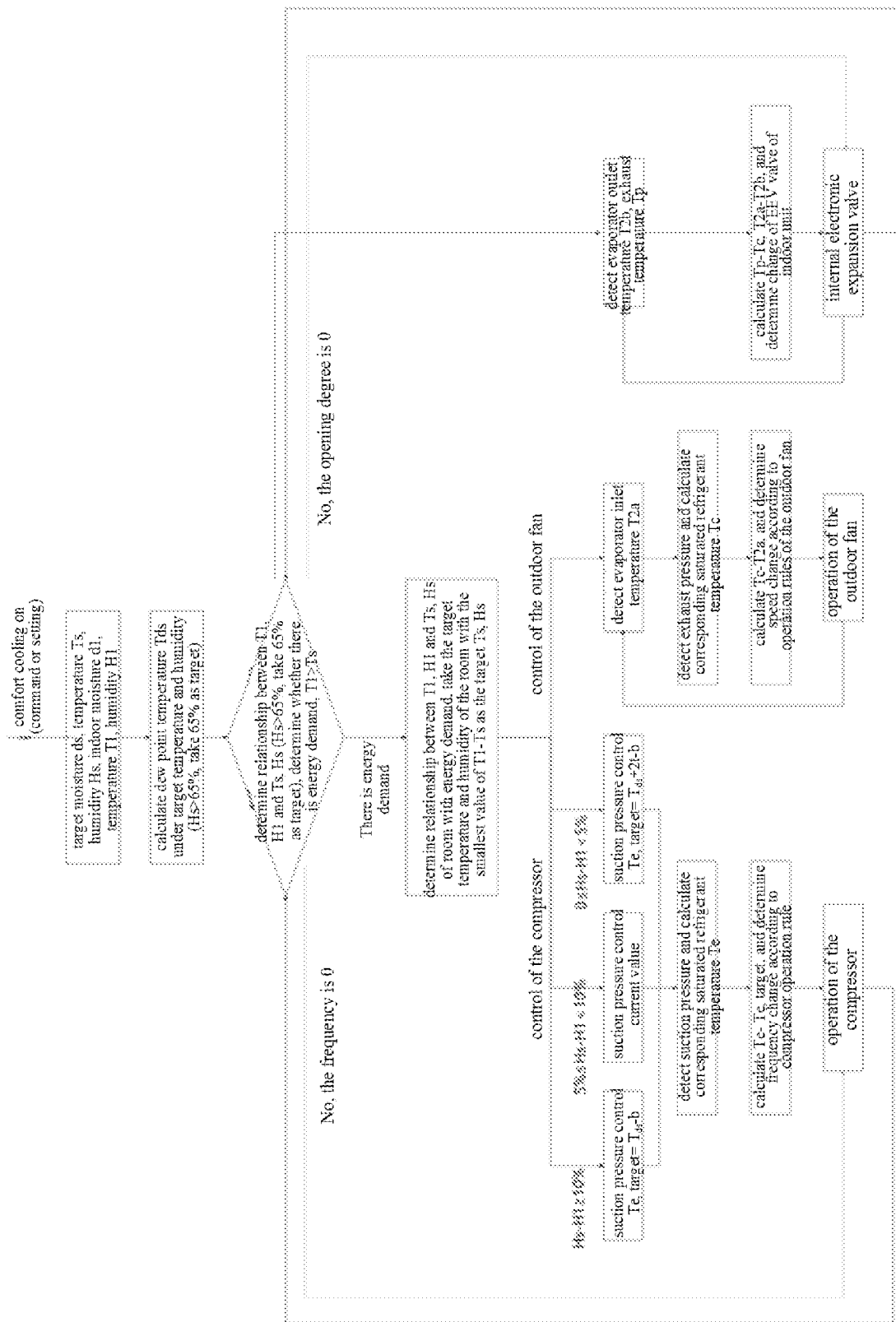
FIG. 8 is a control logic schematic diagram of the comfort cooling of the present disclosure.

In this embodiment, as shown in FIG. 8, when the compressor is controlled for comfortable cooling, the current indoor temperature in the working space corresponding to each indoor unit in the operating state and the preset temperature of each indoor unit in the operating state are obtained. The preset temperature can be set by the user according to the cooling demand. For each indoor unit, the temperature difference between the corresponding current indoor temperature and the corresponding preset temperature is calculated, and the temperature difference is used to represent the cooling demand of the indoor user corresponding to the indoor unit.

Operation S42, adjusting the frequency of the compressor according to the preset temperature and the preset humidity of the indoor unit corresponding to a minimum temperature difference.

In this embodiment, after obtaining the temperature difference corresponding to each indoor unit in the operating state, the indoor unit with the smallest temperature difference is determined, and the frequency of the compressor is adjusted according to the preset temperature and the preset humidity of the indoor unit corresponding to the minimum temperature difference. That is, the frequency of the compressor is adjusted according to the indoor environment parameters with the smallest cooling demand, so that the compressor provides the least cooling capacity, and avoids a large initial capacity of each indoor unit when the cooling capacity is high.

In an embodiment, when adjusting the frequency of the compressor according to the preset temperature and the preset humidity of the indoor unit corresponding to the minimum temperature difference, the target dew point temperature is obtained according to the preset temperature and the preset humidity of the air conditioner, and then the target suction saturation temperature of the compressor is obtained according to the target dew point temperature. The target suction saturation temperature is the refrigerant saturation temperature that needs to be reached by the suction port of the compressor, and the actual saturation temperature of the compressor suction port is the actual saturation temperature corresponding to the suction pressure of the suction port. The preset temperature and the preset humidity are target values preset in the indoor unit, which can be set and adjusted by the user.

In an embodiment, when obtaining the target dew point temperature according to the preset temperature and the preset humidity, it can be determined according to the calculation formula corresponding to the dew point temperature. The calculation formula of the dew point temperature is as follows:

$$T_d = -35.957 - 1.8726\left(\ln H_1 + \frac{C_8}{T} + C_9 + C_{10}*T + C_{11}*T^2 + C_{12}*T^3 + C_{13}*\ln T\right) + 1.1689\left(\ln H_1 + \frac{C_8}{T} + C_9 + C_{10}*T + C_{11}*T^2 + C_{12}*T^3 + C_{13}*\ln T\right)^2$$

$T_d$ is the dew point temperature, T is the temperature, and $H_1$ is the humidity. When calculating the target dew point temperature, the preset temperature is taken as T, the preset humidity is taken as $H_1$, and the calculated $T_d$ is taken as the target dew point temperature. $H_1$ is the relative humidity, the value range is [20%, 90%], T=$T_1$+273.15, where the value range of $T_1$ is [16, 30] ° C., $C_8$=−5800.2206, $c_9$=1.3914993, $c_{10}$=−0.04860239, $c_{11}$=0.41764768*10$^{-4}$, $c_{12}$=−0.14452093*10$^{-7}$, $c_{13}$=6.5459673, the value range of $T_d$ is [6, 22]° C.

After the system is normally initialized and operating, the compressor is adjusted according to the actual suction saturation temperature. In the case of different humidity of the indoor unit, there is a corresponding target suction saturation temperature, and the frequency of the compressor is adjusted by comparing the difference between the target suction saturation temperature and the actual suction saturation temperature Te.

In an embodiment, the indoor unit has a preset humidity, and the preset humidity is a relative humidity, which means the ratio of the absolute humidity of the humid air to the maximum absolute humidity that may be achieved at the same temperature. The higher the temperature, the more water vapor the air can hold, and the greater the maximum absolute humidity that the humid air may reach. Thus, when the indoor temperature is higher, the indoor relative humidity is lower, and when the indoor temperature is lower, the indoor relative humidity is higher. When adjusting the frequency of the compressor to change the temperature of the indoor coil for cooling, as the indoor temperature gradually decreases, the indoor relative humidity must gradually increase. Therefore, the frequency of the compressor can be further adjusted according to the target dew point temperature, so that the current indoor humidity approaches the preset humidity. The target suction saturation temperature can be obtained according to the target dew point temperature, and then the frequency of the compressor can be adjusted according to the difference between the actual suction saturation temperature of the compressor and the target suction saturation temperature, to adjust the indoor relative humidity while cooling the room through adjusting the frequency of the compressor.

In an embodiment, when the target dew point temperature obtains the target suction saturation temperature, the temperature correction value is obtained according to the current indoor humidity and the preset humidity, and the temperature correction value is added to the target dew point temperature to obtain the target suction saturation temperature. Since the temperature correction is determined based on the difference between the current indoor humidity and the preset humidity, when the humidity difference is different, the corresponding temperature correction value is also different, so that the frequency of the compressor and the temperature of the indoor coil are also different, so as to adjust the indoor relative humidity.

In an embodiment, due to the heat transfer temperature difference between the refrigerant in the indoor heat exchanger and the indoor air, the purpose of indoor cooling can only be achieved when the temperature of the refrigerant in the indoor heat exchanger is slightly lower than that of the indoor air. Therefore, the temperature correction value may include a first correction value and a second correction value. The sum of the first correction value and the second correction value is equal to the temperature correction value, the first correction value is calculated according to the difference between the preset humidity and the current indoor humidity, and the second correction value is determined according to an empirical value. For example, the expression for the target dew point temperature $T_{e,\,target}$ is as follows:

$$T_{e,target}=T_{d,s}+f(T,H)-b$$

$T_{d,s}$ is the target dew point temperature, f(T, H) is the first correction value, and −b is the second correction value.

In an embodiment, the second correction value is a fixed preset value, the second correction value is generally set to 4° C., and the range is generally 0 to 10° C. When determining the temperature correction value, if the difference between the preset humidity and the current indoor humidity is greater than the maximum value of the preset humidity range, it indicates that the difference between the preset humidity and the current indoor humidity is large, and the increase rate of relative humidity needs to be increased. The corresponding first correction value is 0, the temperature correction value at this time is the smallest, and the temperature correction value is a preset value, so that the target suction saturation temperature is also small. The difference between the actual suction saturation temperature and the target suction saturation temperature is large, the frequency of the compressor is increased to quickly adjust the actual suction saturation temperature to the target suction saturation temperature. While the indoor temperature decline rate is accelerated, the current indoor humidity increase rate is increased. If the difference between the preset humidity and the current indoor humidity is less than the minimum value of the preset humidity range, it indicates that the difference between the preset humidity and the current indoor humidity is small, and the increase rate of the relative humidity can be gradually reduced so that the current indoor humidity is stable around the preset humidity. Therefore, the corresponding first correction value can be determined according to the duration of the difference being less than the minimum value of the preset humidity range. The first correction value is positively related to the duration. The longer the duration, the larger the first correction value, so that the temperature correction value also gradually increases, the target suction saturation temperature is higher, the difference between the actual suction saturation temperature and the target suction saturation temperature is smaller. The frequency of the compressor is reduced to slowly adjust the actual suction saturation temperature to the target suction saturation temperature. While the indoor temperature decline rate is slowed down, the current indoor humidity increase rate is reduced, so that the current indoor humidity is stable around the preset humidity. If the difference between the preset humidity and the current indoor humidity is within the preset humidity range, it indicates that the increase rate of the relative humidity is appropriate, and the temperature correction value obtained last time can be used as the temperature correction value for this correction. The temperature correction value is acquired regularly so as to regularly correct the target suction saturation temperature, for example, the correction process may be performed every 3 minutes. To sum up, the first correction value f(T, H) is determined according to the humidity. When the difference between the preset humidity and the current indoor humidity is greater than the maximum value of the preset humidity range, the first correction value is 0. When the difference between the preset humidity and the current indoor humidity is less than the minimum value of the preset humidity range, the first correction value is determined according to the duration of the difference being less than the minimum value of the preset humidity range, and the first correction value is positively correlated with the duration of the difference being less than the minimum value of the preset humidity range. When the difference between the preset humidity and the current indoor humidity is within the preset humidity range, the first correction value obtained last time is used as the first correction value this time. The maximum of the first correction value does not exceed 8° C.

In an embodiment, when adjusting the frequency of the compressor according to the difference X between the actual suction saturation temperature and the target suction saturation temperature, the difference X can be compared with the preset difference range. For example, the difference interval may be [4, 1]. If the difference X is within the difference interval, the frequency of the compressor is not adjusted. If the difference X is less than the minimum value of the difference interval, the frequency of the compressor is reduced. The frequency adjustment value when the frequency of the compressor is reduced is positively related to the difference between the minimum value of the difference interval and the difference X. The frequency adjustment action cycle when the frequency of the compressor is reduced is negatively correlated with the difference between the minimum value of the difference interval and the difference X. If the difference X is greater than the maximum value of the difference interval, the frequency of the compressor is increased. The frequency adjustment value when the frequency of the compressor increases is positively correlated to the difference between the difference X and the minimum value of the difference interval. The frequency adjustment action cycle when the frequency of the compressor increases is negatively correlated with the difference between the difference X and the minimum value of the difference interval.

In technical solutions of the present disclosure, the target dew point temperature is obtained according to the preset temperature and the preset humidity of the indoor unit corresponding to the minimum temperature difference, the target suction saturation temperature is obtained according to the target dew point temperature, the frequency of the compressor is adjusted according to the actual suction saturation temperature of the compressor and the target suction saturation temperature to adjust the indoor humidity while the air conditioner is cooling. Adjusting the frequency of the compressor through the actual suction saturation temperature on the low-pressure side of the system can not only reduce the calculation amount when adjusting the frequency of the compressor, but also better meet the user's needs for temperature and humidity. Thus, the system stability is improved.

Figure 4:
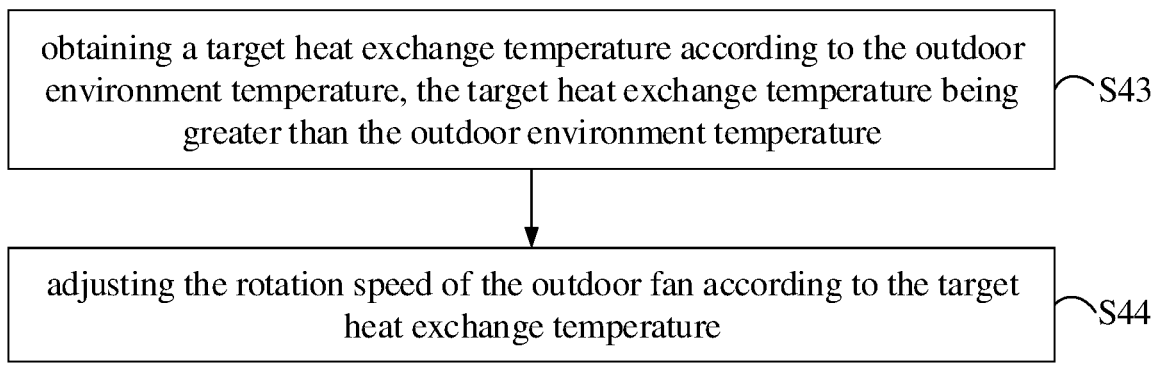
FIG. 4 is a schematic flowchart of the method for controlling the VRF air conditioning system according to still another embodiment of the present disclosure.

In another embodiment, as shown in FIG. 4, based on any one of the embodiments in FIG. 2 or FIG. 3, the operation of adjusting the rotation speed of the outdoor fan according to the outdoor environment temperature includes:

Operation S43, obtaining a target heat exchange temperature according to the outdoor environment temperature, the target heat exchange temperature being greater than the outdoor environment temperature.

In this embodiment, when there is a cooling demand in the room, the air conditioner turns on the cooling function. When the air conditioner is cooling, the heat exchanger of the outdoor unit releases heat, and the high-temperature and high-pressure gaseous refrigerant in the outdoor heat exchanger condenses into a medium-temperature and high-pressure liquid refrigerant, which flows to the indoor heat exchanger to absorb heat. The heat dissipation efficiency of the outdoor heat exchanger is related to the outdoor fan. The higher the rotation speed of the outdoor fan, the higher the cooling efficiency of the outdoor heat exchanger. At the same time, the heat dissipation efficiency of the outdoor heat exchanger is also related to the outdoor environment temperature. The greater the difference between the refrigerant temperature in the outdoor heat exchanger and the outdoor environment temperature, the greater the heat dissipation efficiency of the outdoor heat exchanger. Therefore, when the outdoor fan is controlled, the rotation speed of the outdoor fan is generally controlled according to the difference between the outdoor environment temperature and the temperature of the refrigerant, so that the refrigerant condenses to reach the outdoor environment temperature to achieve a better heat dissipation effect.

When the outdoor fan is controlled for comfortable cooling, the outdoor environment temperature is obtained. The target heat exchange temperature of the outdoor heat exchanger is obtained according to the outdoor environment temperature, and the target heat exchange temperature is the temperature that the refrigerant needs to reach after passing through the heat exchange of the outdoor heat exchanger. When the target heat transfer temperature is obtained according to the outdoor environment temperature, the outdoor environment temperature can be added to the preset temperature experience value to obtain the target heat transfer temperature greater than the outdoor environment temperature. The preset temperature experience value should not be overly large. If the preset temperature experience value is overly large, the temperature of the refrigerant exchanged by the outdoor heat exchanger will be overly high. As a result, the cooling effect of the indoor heat exchanger is unsatisfactory to meet the cooling needs of indoor users.

Operation S44, adjusting the rotation speed of the outdoor fan according to the target heat exchange temperature.

In this embodiment, when the rotation speed of the outdoor fan is adjusted according to the target heat exchange temperature greater than the outdoor environment temperature, the heat exchange efficiency of the outdoor heat exchanger is adjusted through the change of the rotation speed of the outdoor fan, so that the outlet refrigerant temperature of the outdoor heat exchanger approaches the target heat exchange temperature. In an ideal state, the outlet refrigerant temperature is equal to the target heat exchange temperature. In this way, the temperature of the refrigerant after heat exchange will be slightly higher than the outdoor environment temperature reached after the refrigerant heat exchange in the conventional method. After the refrigerant flows into the coils of each indoor heat exchanger, the temperature of each indoor coil will be slightly higher than that of the conventional method. After the temperature of each indoor coil rises, the dehumidification capacity of each indoor unit decreases, thereby reducing the dehumidification capacity of each indoor unit during cooling.

Figure 9:
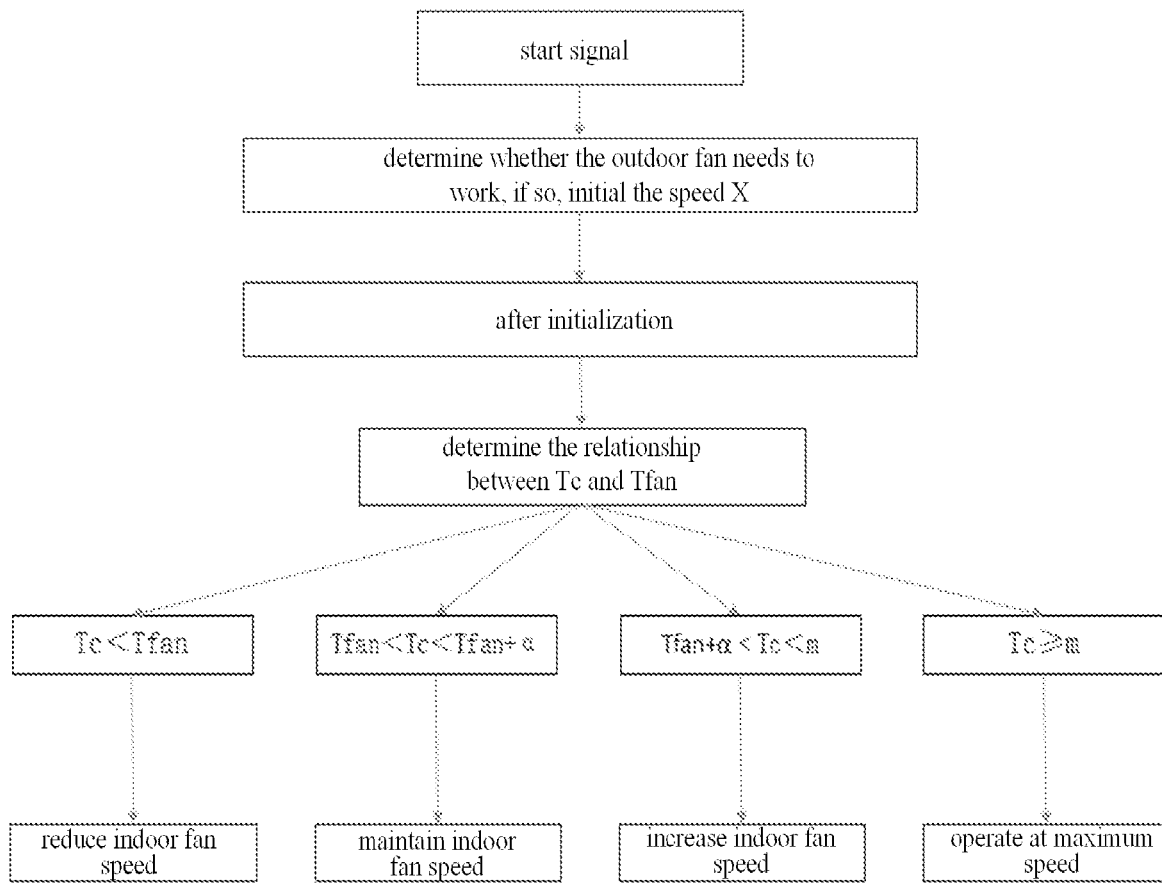
FIG. 9 is a schematic diagram of the control logic of an outdoor fan of the present disclosure.

In an embodiment, when the rotation speed of the outdoor fan is adjusted according to the target heat exchange temperature, the exhaust saturation temperature of the compressor is obtained. The exhaust saturation temperature is compared with the target heat transfer temperature. When the exhaust saturation temperature is lower than the target heat exchange temperature, the rotation speed of the outdoor fan is reduced to reduce the heat dissipation effect of the outdoor heat exchanger and increase the exhaust saturation temperature. If the exhaust saturation temperature is higher than the target heat exchange temperature, the rotation speed of the outdoor fan is increased to improve the heat exchange effect of the outdoor heat exchanger and increase the exhaust saturation temperature, so as to maintain exhaust saturation at the target heat exchange temperature, the outlet refrigerant temperature of the outdoor heat exchanger is equal to the target heat exchange temperature. For example, as shown in FIG. 9, the target heat transfer temperature Tfan is equal to T4+β and the value range is [35, 55]° C. The value range of β is [2, 12]° C., and the rotation speed of the outdoor fan is adjusted according to the difference Y between the exhaust saturation temperature Tc and the target heat exchange temperature Tfan, as follows:

After the system is normally initialized and running, if Y is not equal to 0, the rotation speed of the outdoor fan is adjusted every t1, and if Y is equal to 0, the rotation speed of the outdoor fan is adjusted every t2, t2 is greater than t1.

The adjustment rules for the rotation speed of the outdoor fan are as follows:

When Tc<Tfan, the rotation speed of the outdoor fan is reduced according to Tc-Tfan;

When Tfan≤Tc≤Tfan+α, the current rotation speed of the outdoor fan is maintained;

When Tfan+α<Tc<m, the rotation speed of the outdoor fan is increased according to Tc−Tfan−α;

When Tc≥m° C., the outdoor fan is controlled to run at the maximum speed, the exhaust saturation temperature is reduced as soon as possible, to avoid abnormally high exhaust saturation temperature.

Tfan=T4+β, and the value range of Tfan is [35, 55]° C., and the value range of m is [55, 65]° C.

The rounding method for the fan speed:

(1) Stepless speed regulation, the change of the fan speed can be accurate to 1 revolution;

After the speed adjustment value ΔX of the outdoor fan is normally taken, it is multiplied by the corresponding gear, such as 20 rpm/gear, then the change of the fan speed is ΔX*20 rounded up.

(2) Not stepless speed regulation or other simplified control means;

After the normal value of ΔΔX is taken, take the integer directly and adopt the rounding method, 0.1~0.4 returns to 0, and 0.5~1.4 returns to 1, then the change of the fan speed is the rounded value multiplied by the gear conversion value, such as [ΔX]*20.

In an embodiment, the exhaust saturation temperature of the compressor refers to the saturation temperature corresponding to the exhaust pressure of the compressor. According to the physical properties of the refrigerant, the pressure and the corresponding saturation temperature can be obtained through relevant software or formulas, and the pressure and temperature conversion can be realized, as shown in the following formula:

$$P = \exp\left[a + \frac{b}{T} + cT + dT^2 + \frac{e(f+T)\ln(f+t)}{T}\right].$$

In an embodiment, when the air conditioner is cooling, the current indoor humidity is obtained. If the current indoor humidity is lower than the humidity threshold, it indicates that the current humidity is overly low. Therefore, the humidifying device of the air conditioner can be controlled to operate, and when the current indoor humidity is greater than or equal to the humidity threshold, the humidifying device can be controlled to stop operating.

In technical solutions of the present disclosure, by adjusting the rotation speed of the outdoor fan, the heat exchange temperature of the outdoor heat exchanger is higher than the outdoor environment temperature. Compared with the existing control method, the heat exchange temperature is higher, and the evaporation temperature of each indoor unit will be correspondingly increased, thereby reducing the dehumidification capacity of each indoor unit during cooling.

Figure 5:
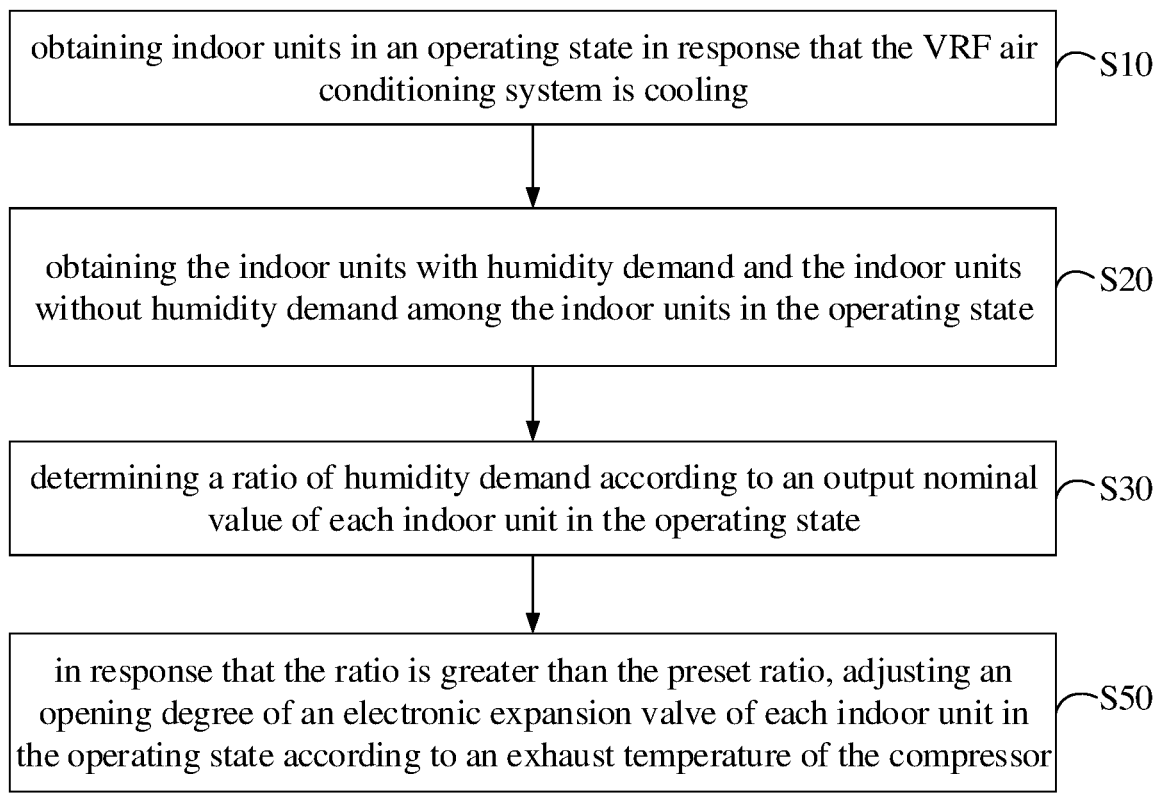
FIG. 5 is a schematic flowchart of the method for controlling the VRF air conditioning system according to yet another embodiment of the present disclosure.

In another embodiment, as shown in FIG. 5, based on any one of the embodiments shown in FIG. 2 to FIG. 4, after the operation S30, the method further includes:

Operation S50, in response to that the ratio of the humidity demand is greater than the preset ratio, adjusting an opening degree of an electronic expansion valve of each indoor unit in the operating state according to an exhaust temperature of the compressor.

In this embodiment, after determining the ratio of humidity demand according to the output nominal value of each indoor unit in the operating state, if the ratio of the humidity demand is greater than the preset ratio, the electronic expansion valve connected to the indoor heat exchanger in each indoor unit can also be controlled to perform comfortable cooling. As shown in FIG. 7, the opening degree of the electronic expansion valve of each indoor unit in the operating state is adjusted according to the exhaust temperature of the compressor. If the ratio of the humidity demand is less than or equal to the preset ratio, the electronic expansion valve is controlled to perform conventional cooling, and the opening degree of the electronic expansion valve is adjusted according to the conventional refrigeration control logic.

Figure 10:
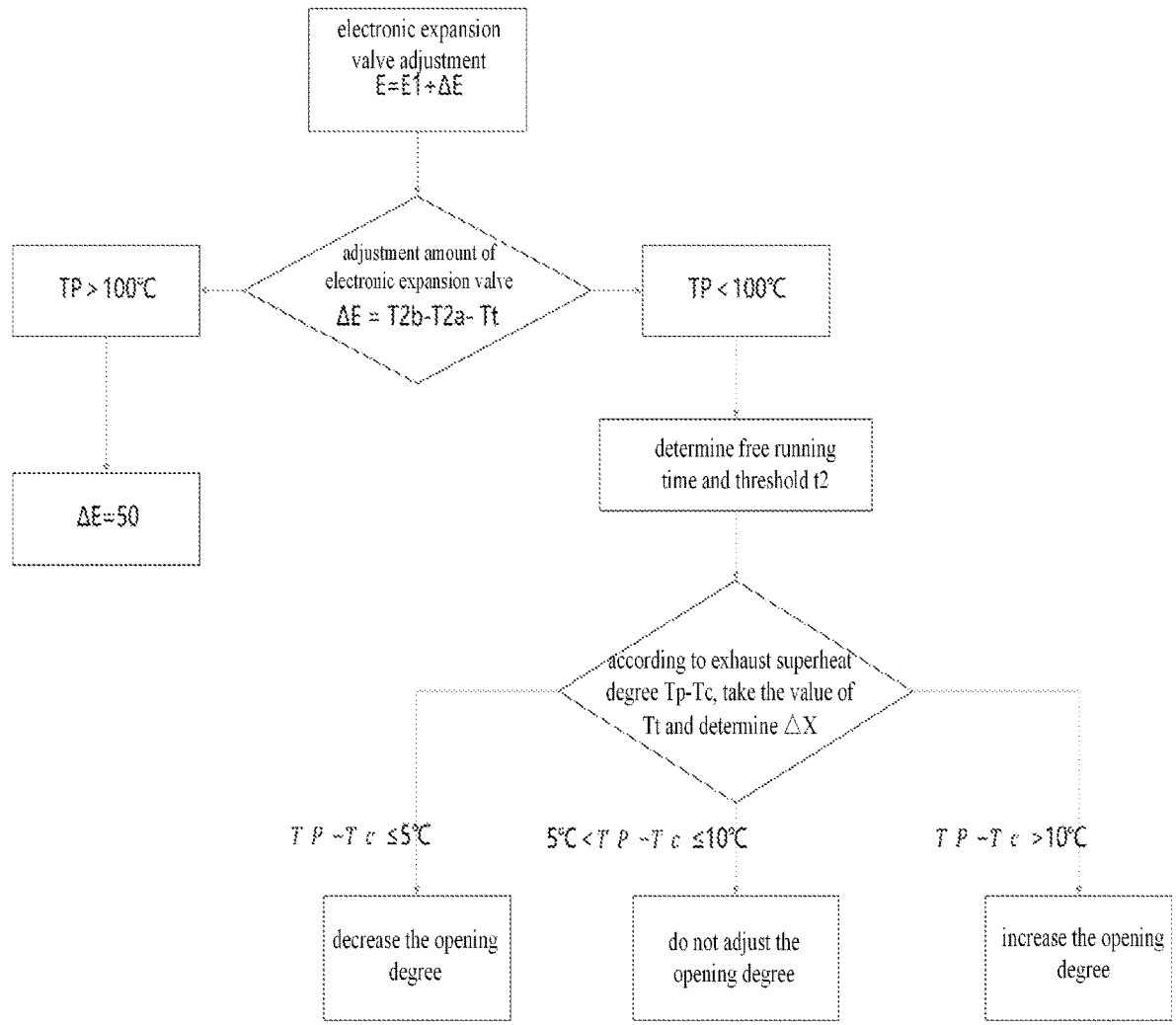
FIG. 10 is a schematic diagram of the control logic of an electronic expansion valve of the present disclosure.

In an embodiment, as shown in FIG. 10, when adjusting the opening degree of the electronic expansion valve according to the exhaust temperature, if the exhaust temperature is greater than or equal to the exhaust temperature threshold, the opening degree of the electronic expansion valve is adjusted to a preset opening degree, and the preset opening degree is a smaller opening degree. For example, the preset opening degree can be 50P, so as to prevent the refrigerant from being unable to circulate due to the complete closure of the electronic expansion valve, and the exhaust temperature is higher. If the exhaust temperature is lower than the exhaust temperature threshold, how to adjust the opening degree of the electronic expansion valve is determined according to an exhaust superheat degree.

In an embodiment, when the exhaust superheat degree is greater than the maximum value of the preset superheat range, it indicates that the current cooling capacity is overly high. Therefore, the opening degree of the electronic expansion valve can be increased to reduce the exhaust superheat degree, reduce refrigeration and reduce dehumidification. When the exhaust superheat degree is less than the minimum value of the preset superheat range, it indicates that the current opening degree of the electronic expansion valve may be large, which may cause the compressor to suck liquid and damage the compressor. Therefore, the opening degree of the electronic expansion valve can be reduced. When the exhaust superheat degree is within the preset superheat range, it provides a certain cooling capacity to meet the cooling needs of indoor users, and avoids the problem of the compressor to suck liquid.

In an embodiment, the opening degree of the electronic expansion valve is 0.

The opening degree can be adjusted as follows:

1) Initial steps E1 and duration t1, then operate in automatic control mode.

The value range of E1 can be 50~120 P, and the value range of duration t1 can be 40~120 S.

2) Enter automatic control, within duration t2, the target step number of electronic expansion valve is calculated every X1 seconds; after duration t2, it is calculated every X2 seconds.

The value range of t2 can be 5~15 min; the value range of X1 can be 10 s~30 s; the value range of X2 can be 30 s~70 s.

The formula for adjusting the opening degree of the electronic expansion valve is as follows:

$$E = E1 + \Delta E, \text{ the range of } \Delta E \text{ is } [k1, k2]$$

The value range of k1 can be 50~90 P; the value range of k2 can be 300~520 P, and the rule of $\Delta E$ is:

(1) When the exhaust temperature TP is not less than 100° C., $\Delta E$ is equal to 50 P, to avoid the refrigerant not circulating due to valve closing, and the exhaust temperature is higher;

(2) When the exhaust temperature TP is less than 100° C., the opening degree of the electronic expansion valve is adjusted according to the exhaust superheat degree. When the exhaust superheat degree is greater than the maximum value of the preset superheat range, the opening degree of the electronic expansion valve is increased, and when the exhaust superheat degree is within the preset superheat range, the opening degrees of the electronic expansion valve is not adjusted. When the exhaust superheat degree is lower than the minimum value of the preset superheat range, the opening degree of the electronic expansion valve is reduced. The opening adjustment value of the electronic expansion valve can be determined according to the difference between the outlet temperature of the indoor heat exchanger and the inlet temperature of the indoor heat exchanger.

In technical solutions of the present disclosure, the opening degree of the electronic expansion valve is adjusted according to the exhaust superheat degree. Compared with the existing control method, the opening degree of the electronic expansion valve is smaller overall, so as to avoid damage to the compressor caused by sucking fluid.

In addition, the embodiments of the present disclosure further provide a VRF air conditioning system, including: a memory, a processor, and a program for controlling the VRF air conditioning system stored in the memory and executable on the processor, wherein when the program for controlling the VRF air conditioning system is executed by the processor, the operations of the method for controlling the VRF air conditioning system described in the above embodiments are implemented.

In addition, the embodiments of the present disclosure further provide a computer-readable storage medium. A program for controlling a VRF air conditioning system is stored in the computer-readable storage medium, and when the program for controlling the VRF air conditioning system is executed by a processor, the operations of the method for controlling the VRF air conditioning system described in the above embodiments are implemented.

It should be noted that, in this document, the terms "comprise", "include" or any other variants thereof are intended to cover a non-exclusive inclusion. Thus, a process, method, article, or system that includes a series of elements not only includes those elements, but also includes other elements that are not explicitly listed, or also includes elements inherent to the process, method, article, or system. If there are no more restrictions, the element defined by the sentence "including a . . . " does not exclude the existence of other identical elements in the process, method, article or system that includes the element.

The serial numbers of the foregoing embodiments of the present disclosure are only for description, and do not represent the advantages and disadvantages of the embodiments.

Through the description of the above embodiment, those skilled in the art can clearly understand that the above-mentioned embodiments can be implemented by software plus a necessary general hardware platform, and can also be implemented by hardware, but in many cases the former is a better implementation. Based on this understanding, the technical solution of the present disclosure can be embodied in the form of software product in essence or the part that contributes to the existing technology. The computer software product is stored in a computer-readable storage medium (such as ROM/RAM, magnetic disk, optical disk) as described above, including several instructions to cause a terminal device (which can be a mobile phone, a computer, a server, an air conditioner, or a network device, etc.) to execute the method described in each embodiment of the present disclosure.

The above are only some embodiments of the present disclosure, and do not limit the scope of the present disclosure thereto. Under the concept of the present disclosure, equivalent structural transformations made according to the description and drawings of the present disclosure, or direct/indirect application in other related technical fields are included in the scope of the present disclosure.

What is claimed is:

1. A method for controlling a variable refrigerant flow (VRF) air conditioning system, comprising:
    obtaining indoor units in an operating state in response to that the VRF air conditioning system is cooling;
    obtaining indoor units with humidity demand and indoor units without humidity demand among the indoor units in the operating state;
    determining a ratio of humidity demand according to an output nominal value of each indoor unit in the operating state, wherein the ratio of the humidity demand comprises a ratio of a total output nominal value of the indoor units with humidity demand to a total output nominal value of the indoor units without humidity demand, or the ratio of the humidity demand comprises a ratio of the total output nominal value of the indoor units with humidity demand to the total output nominal value of the indoor units with humidity demand and the indoor units without humidity demand; and
    in response to that the ratio of the humidity demand is greater than a preset ratio, adjusting a rotation speed of an outdoor fan according to an outdoor environment temperature and/or adjusting a frequency of a compressor according to a preset humidity corresponding to the indoor unit in the operating state.

2. The method for controlling the VRF air conditioning system according to claim 1, wherein the obtaining the indoor units with humidity demand and the indoor units without humidity demand among the indoor units in the operating state comprises:
    detecting a state of a working space corresponding to the indoor units in the operating state; and
    obtaining the indoor units with humidity demand and the indoor units without humidity demand among the indoor units that are in the operating state and the state of the working space is occupied.

3. The method for controlling the VRF air conditioning system according to claim 1, wherein the adjusting the frequency of the compressor according to the preset humidity corresponding to the indoor unit in the operating state comprises:
    obtaining a temperature difference between a current indoor temperature and a corresponding preset temperature corresponding to each indoor unit in the operating state; and
    adjusting the frequency of the compressor according to the preset temperature and the preset humidity of the indoor unit corresponding to a minimum temperature difference.

4. The method for controlling the VRF air conditioning system according to claim 3, wherein the adjusting the frequency of the compressor according to the preset temperature and the preset humidity of the indoor unit corresponding to the minimum temperature difference comprises:
    obtaining a target dew point temperature according to the preset temperature and the preset humidity of the indoor unit corresponding to the minimum temperature difference;
    obtaining a target suction saturation temperature according to the target dew point temperature; and
    adjusting the frequency of the compressor according to an actual suction saturation temperature of the compressor and the target suction saturation temperature.

5. The method for controlling the VRF air conditioning system according to claim 1, further comprising:
    in response to that the ratio of the humidity demand is greater than the preset ratio, adjusting an opening degree of an electronic expansion valve of each indoor unit in the operating state according to an exhaust temperature of the compressor.

6. The method for controlling the VRF air conditioning system according to claim 5, wherein the adjusting the opening degree of the electronic expansion valve of each indoor unit in the operating state according to the exhaust temperature of the compressor comprises:
    in response to that the exhaust temperature is greater than or equal to an exhaust temperature threshold, adjusting the opening degree of the electronic expansion valve of each indoor unit in the operating state according to a preset opening degree adjustment value; or
    in response to that the exhaust temperature is lower than the exhaust temperature threshold, adjusting the opening degree of the electronic expansion valve of each indoor unit in the operating state according to an exhaust superheat degree.

7. The method for controlling the VRF air conditioning system according to claim 1, wherein the adjusting the rotation speed of the outdoor fan according to the outdoor environment temperature comprises:
    obtaining a target heat exchange temperature according to the outdoor environment temperature, the target heat exchange temperature being greater than the outdoor environment temperature; and
    adjusting the rotation speed of the outdoor fan according to the target heat exchange temperature.

8. The method for controlling the VRF air conditioning system according to claim 7, wherein the adjusting the rotation speed of the outdoor fan according to the target heat exchange temperature comprises:
    obtaining an exhaust saturation temperature of the compressor, the exhaust saturation temperature being a saturation temperature corresponding to an exhaust pressure of the compressor;
    in response to that the exhaust saturation temperature is less than or equal to the target heat exchange temperature, reducing the rotation speed of the outdoor fan; or
    in response to that the exhaust saturation temperature is greater than the target heat exchange temperature, increasing the rotation speed of the outdoor fan.

9. The method for controlling the VRF air conditioning system according to claim 1, further comprising:
    in response to that the ratio of the humidity demand is less than the preset ratio, adjusting the opening degree of the electronic expansion valve of each indoor unit according to an outlet temperature of an indoor heat exchanger of each indoor unit in the operating state.

10. The method for controlling the VRF air conditioning system according to claim 9, further comprising:
    in response to adjusting the opening degree of the electronic expansion valve of the indoor unit according to the outlet temperature of the indoor heat exchanger of each indoor unit in the operating state, obtaining a current indoor humidity corresponding to the indoor unit with humidity demand;

in response to that the current indoor humidity corresponding to the indoor unit with humidity demand is lower than a first humidity, controlling a humidifying device corresponding to the indoor unit with humidity demand to operate; and in response to that the humidifying device is operating, if the current indoor humidity corresponding to the indoor unit with humidity demand is greater than a second humidity, controlling the humidifying device to stop operating, the second humidity being greater than the first humidity.

11. A variable refrigerant flow (VRF) air conditioning system, comprising:

a processor; and a memory storing a program for controlling the VRF air conditioning system, the program, when executed, causing the processor to implement the method for controlling the VRF air conditioning system according to claim 1.

12. A non-transitory computer-readable storage medium storing a program for controlling a variable refrigerant flow (VRF) air conditioning system, wherein the program, when executed by a processor, implements the method for controlling the VRF air conditioning system according to claim 1.

* * * * *